US012566984B2

(12) United States Patent
Sharpe et al.

(10) Patent No.:  US 12,566,984 B2
(45) Date of Patent:  Mar. 3, 2026

(54) METHODS AND SYSTEMS FOR EXPLAINING ARTIFICIAL INTELLIGENCE AND MACHINE LEARNING

(71) Applicant: Capital One Services, LLC, McLean, VA (US)

(72) Inventors: Samuel Sharpe, Cambridge, MA (US); Christopher Bayan Bruss, Washington, DC (US); Brian Barr, Schenectady, NY (US); Sahil Verma, San Francisco, CA (US); Jocelyn Huang, Purcellville, VA (US)

(73) Assignee: Capital One Services, LLC, McLean, VA (US)

( * ) Notice: Subject to any disclaimer, the term of this patent is extended or adjusted under 35 U.S.C. 154(b) by 824 days.

(21) Appl. No.: 17/815,161

(22) Filed: Jul. 26, 2022

(65) Prior Publication Data

US 2024/0037427 A1      Feb. 1, 2024

(51) Int. Cl.
| | |
|---|---|
| *G06N 5/045* | (2023.01) |
| *G06F 11/34* | (2006.01) |
| *G06N 20/00* | (2019.01) |

(52) U.S. Cl.
CPC ......... *G06N 5/045* (2013.01); *G06F 11/3495* (2013.01); *G06N 20/00* (2019.01)

(58) Field of Classification Search
None
See application file for complete search history.

(56) References Cited

PUBLICATIONS

James G, Witten D, Hastie T, Tibshirani R. An introduction to statistical learning. New York: springer; Jun. 2013, corrected 8th printing 2017. 441 pages. (Year: 2017).*
Sahlaoui H, Nayyar A, Agoujil S, Jaber MM. Predicting and interpreting student performance using ensemble models and shapley additive explanations. IEEE Access. Oct. 29, 2021;9:152688-703. (Year: 2021).*
Sundararajan M, Taly A, Yan Q. Axiomatic attribution for deep networks. InInternational conference on machine learning Jul. 17, 2017 (pp. 3319-3328). PMLR. (Year: 2017).*
Covert, Ian, Scott Lundberg, and Su-In Lee. "Feature removal is a unifying principle for model explanation methods." arXiv preprint arXiv:2011.03623. Nov. 6, 2020. 21 pages. (Year: 2020).*
Ribeiro, Marco Tulio, Sameer Singh, and Carlos Guestrin. ""Why should i trust you?" Explaining the predictions of any classifier." In Proceedings of the 22nd ACM SIGKDD international conference on knowledge discovery and data mining, pp. 1135-1144. 2016. (Year: 2016).*

* cited by examiner

*Primary Examiner* — Vincent Gonzales
(74) *Attorney, Agent, or Firm* — Foley & Lardner LLP

(57)          ABSTRACT

A computing system may generate a first set of importance metrics (e.g., scores or values) for a model. The importance metrics may be generated using an explainable artificial intelligence technique, and an individual importance metric may indicate how influential a corresponding feature is for a decision made by a model. The computing system may determine an important feature and create a modified dataset by removing the important feature from the dataset. The computing system may train the model on the modified dataset and evaluate the performance of the model to determine the effect of removing the feature (e.g., which may indicate how important the feature is to output generated by the model). This process may be repeated for additional features and additional performance metrics may be obtained.

20 Claims, 5 Drawing Sheets

100

344

ML Model 342

346

400

METHODS AND SYSTEMS FOR EXPLAINING ARTIFICIAL INTELLIGENCE AND MACHINE LEARNING

BACKGROUND

Explainable artificial intelligence or machine learning (XAI) includes a set of methods that allows human users to understand why certain results or output was generated by a machine learning model. XAI may be used to explain a machine learning model's reasoning and characterize the strengths and weaknesses of the model's decision-making process. XAI may be necessary to establish trust in the output generated by machine learning models. For example, for ethical reasons, legal reasons, and to increase trust, a doctor may need to understand why a machine learning model is recommending a particular procedure for a patient.

SUMMARY

Computing systems may attempt to explain artificial intelligence and machine learning by determining the influence a particular feature has on a decision made by a model. Conventional systems determine how effective a feature importance determination technique (or an XAI technique) is at explaining a decision made by a machine learning model by replacing data with a perturbation or ablation that indicates a missingness of the data. For example, conventional systems may replace a pixel in an image with a black pixel. The machine learning model is then evaluated using that data that has been altered to include the perturbations, and any change in performance is interpreted as an indication of the importance of the data that was altered. However, replacing data with perturbations may cause performance issues for a model that lead to inaccurate assessments of feature importance determination techniques. For example, the perturbations used to replace data may cause drastic changes in distributions of the data and thus the presence of the perturbations (rather than the missingness of the important feature) may be the main contribution to a decrease in the model's performance. In these conventional systems, a decrease in model performance may be incorrectly attributed to the missingness of a particular feature, when the decrease in model performance should instead be attributed to the perturbations.

Moreover, conventional XAI methods and systems do not provide a way to compare multiple different explanations for results of a machine learning model. It may be difficult to determine which explanation to trust when a first XAI technique produces an explanation for a classification of a machine learning model and a second XAI technique produces a different explanation for the same classification. For example, a first XAI technique may indicate that feature A was most influential for a particular classification while a second XAI technique may indicate that feature B was most influential to the classification made by the machine learning model. Thus, with conventional techniques, it may be difficult to determine which explanation should be used.

To address these problems, non-conventional methods and systems described herein provide for the comparison of the effectiveness of different model explanation techniques and allow for the identification of features in data that contribute to decisions made by a model. Specifically, methods and systems described herein create a modified dataset by dropping one or more features that have been identified as being important for decisions made by a model. The model is then retrained using the modified dataset. The performance of the model (e.g., after being retrained) is compared with the original performance of the model (e.g., the original performance of the model after being trained on the original or complete dataset). Evaluating, the model and importance of features in this way eliminates the need for replacing data with perturbations and their associated drawbacks described above. Although retraining the model with a modified dataset from which a feature has been dropped may require additional computing resources, it allows for improved evaluations of explanation methods and thus allow for improved explainability of models (e.g., machine learning or artificial intelligence models) through proper selection of superior XAI techniques. By providing a better way to evaluate XAI techniques, systems described herein can determine and use the XAI techniques that are found to be superior to other XAI techniques for identifying features that are important for classifications made by machine learning models.

In some embodiments, a computing system may generate a first set of importance metrics (e.g., scores or values) for a model. The importance metrics may be generated using an XAI technique, and an individual importance metric may indicate how influential a corresponding feature is for a decision (e.g., a classification or other output) made by a model. The computing system may determine the most important feature (e.g., the feature with the greatest corresponding importance metric) and create a modified dataset by removing the feature from the dataset. The computing system may train the model on the modified dataset and evaluate the performance of the model to determine the effect of removing the feature (e.g., which may indicate how important the feature is to output generated by the model). This process may be repeated for additional features (e.g., in order of importance as indicated by corresponding importance metrics) and additional performance metrics may be obtained.

The computing system may use the performance metrics to determine the effectiveness of the technique used to explain the model (e.g., whether the importance metrics are correctly identifying the most important features). For example, after removing the most important feature, the computing system may expect to have the greatest decrease in performance. Additionally, the computing system may expect that subsequent removal of less important features would have smaller decreases in performance of the model (e.g., because the features are not as influential). In this way, the computing system may determine whether a particular set of importance metrics should be used to explain output generated by a model.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
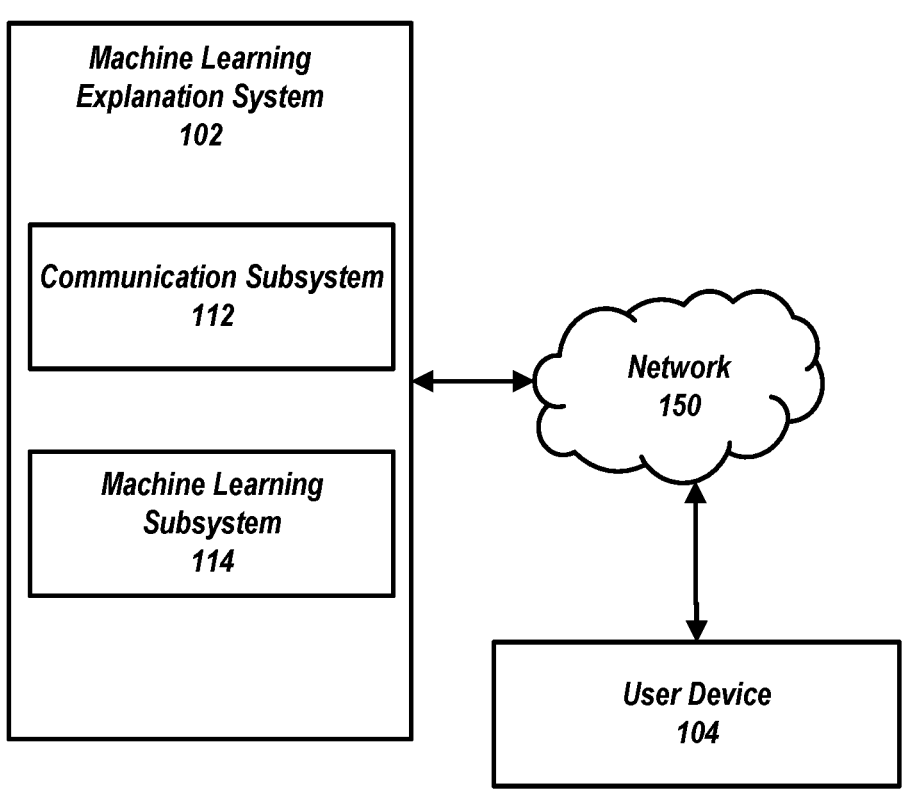
FIG. 1 shows an example system for explaining output generated by models, in accordance with some embodiments.

FIG. 1 shows an example computing system 100 for determining devices connected to a power source, and the amount of power consumed by each device. The system 100 may include a machine learning (ML) explanation system 102 and a user device 104. The ML explanation system 102 may include a communication subsystem 112, a machine learning subsystem 114, or other components. The ML explanation system 102 may be implemented in software and may execute on the user device 104. The communication subsystem 112 may receive input from the user device 104, for example, that causes the ML explanation system 102 to perform one or more actions described below.

The ML explanation system 102 may generate a plurality of importance metrics. Each importance metric of the plurality of importance metrics may correspond to a respective feature of a feature set used by a machine learning model. The importance metrics may be obtained using an XAI technique and may be a score that indicates how influential a corresponding feature is in a classification or other output generated by a model (e.g., a machine learning model). For example, the importance metrics may be Shapley Additive exPlanations (SHAP) values, local interpretable machine learning (LIME) values, or may be generated using layer-wise relevance propagation techniques, generalized additive model techniques, or a variety of other XAI techniques.

The feature set may include all of the features used in a dataset for training the machine learning model. For example, a first importance metric may correspond to a first feature of the dataset and a second importance metric may correspond to a second feature of the dataset. Each importance metric (e.g., value) may help explain why a decision was made by the machine learning model or may indicate to what degree a corresponding feature influenced a decision made by the machine learning model (e.g., in making a classification or in generating other output). For example, an importance metric of 156 for feature A may indicate that feature A was more influential than feature B, with an importance metric of 84, in a classification made by a model.

The ML explanation system 102 may sort the plurality of importance metrics. For example, the plurality of importance metrics may include rational numbers and the ML explanation system 102 may sort each importance metric in ascending (e.g., smallest to largest) or descending order (e.g., largest to smallest).

The ML explanation system 102 may determine a first importance metric having a greatest importance among the feature set, for example, based on the sorting of the plurality of importance metrics. This may allow the ML explanation system 102 to determine an order in which to drop (e.g., remove) features from the dataset and may enable the ML explanation system 102 to evaluate the effectiveness of the importance metrics. The first importance metric may correspond to a feature that has been determined to be the most influential feature of the dataset or feature set. For example, if the feature set includes feature A with a corresponding importance metric of 110, feature B with a corresponding importance metric of 56, and feature C with a corresponding importance metric of 84, then the ML explanation system 102 may determine that 110 is the first importance metric because it has the greatest importance metric (e.g., 110 is greater than the importance metrics of 84 and 56 for features C and B respectively).

The ML explanation system 102 may determine a first feature corresponding to the first importance metric. For example, if the first importance metric (e.g., the greatest importance metric) corresponds to feature A, then the ML explanation system 102 may determine that the first feature is feature A. The ML explanation system 102 may determine the first feature so that it can be dropped from the dataset. By removing the first feature from the dataset and retraining the machine learning model, the ML explanation system 102 may determine the effect the first feature had on the performance of the machine learning model. If the first feature is truly as important as the corresponding importance metric indicates, the machine learning model may have a large drop (e.g., greater than a threshold decrease compared to performance of the machine learning model when trained on the full dataset that includes the first feature) in performance after removing the first feature. However, if dropping the first feature does not lead to a large decrease in performance (e.g., less than a threshold decrease when compared to performance of the machine learning model when trained on the full dataset that includes the first feature), the ML explanation system 102 may determine that the importance metrics should not be used to explain classifications or other output generated by the machine learning model.

The ML explanation system 102 may determine a subset of the first dataset that corresponds to the first feature. For example, the first dataset may be arranged in rows and columns with each feature representing a column and each instance of data represented as a row in the dataset. The first feature may be represented as an individual column in the first dataset. For example, feature A (e.g., as discussed above) may be the first column in the first dataset. The subset of the first dataset may be determined to be the first column in the first dataset.

The ML explanation system 102 may generate a second dataset by filtering the subset from the first dataset. Filtering the subset may include deleting the subset. For example, the ML explanation system 102 may generate the second dataset by creating a copy of the first dataset and deleting the subset (e.g., one or more columns) from the copy of the first dataset.

The ML explanation system 102 may retrain the machine learning model using the second dataset. The second dataset may include each feature of the feature set that was included in the first dataset except for the subset of the first dataset that was filtered (e.g., removed). The ML explanation system 102 may use the second dataset to retrain the machine learning model from scratch. For example, one or more parameters (e.g., weights) of the machine learning model may be reset to their starting values or random values. The ML explanation system 102 may train the machine learning model using the second dataset. For example, the machine learning model may be trained using the same training techniques that were used with the first dataset. The machine learning model may be trained, for example, as discussed in connection with FIG. 3 below.

The ML explanation system 102 may generate a first performance metric of the machine learning model. The first performance metric may indicate an amount that the performance of the machine learning model changed due to removal of the first feature from the first dataset. For example, the first performance metric may be an accuracy measurement of the machine learning model after being trained on the second dataset. The first performance metric may be compared (e.g., subtracted from) an overall performance metric that corresponds to the performance of the machine learning model after being trained on the first dataset (e.g., the dataset with all features included). The difference between the first performance metric and the overall performance metric may indicate an amount that the performance of the machine learning model changed (e.g., decreased or increased) due to filtering the first feature from the first dataset.

The performance metric may be used to determine the effect of removing features from the first dataset. The process of removing features from the first dataset may be repeated (e.g., with replacement or without replacement). In this way, additional performance metrics may be generated by retraining the machine learning model on datasets that are missing one or more different features. For example, a second feature corresponding to the second greatest importance metric may be removed from the first dataset, and a performance metric that indicates how well the machine learning model performed without the second feature may be obtained. The first and second performance metrics may be part of a first set of performance metrics. The first set of performance metrics may be compared with a second set of performance metrics. The second set of performance metrics may correspond to different importance metrics. For example, the first set of importance metrics may be generated using SHAP values and the second set of importance metrics may be generated using LIME values.

By comparing the first and second sets of performance metrics, the ML explanation system 102 may determine which importance metrics should be used to explain a classification or other output made by the machine learning model. For example, if the change in performance metrics in the first set of performance metrics follows a particular pattern (e.g., the performance metrics, when plotted, form a line with a decreasing slope) and the change in performance metrics in the second set of performance metrics has a great deal of variance (e.g., there are more than a threshold number of changes between positive and negative slopes between consecutive pairs of performance metrics in the second set of performance metrics), then the ML explanation system 102 may determine that the first set of performance metrics more accurately reflects an expected change in performance based on the corresponding importance metrics.

In response, the ML explanation system 102 may determine that the first set of importance metrics should be used to explain classifications or other output generated by the machine learning model. For example, if the feature that has been determined to be the most important feature (e.g., because its corresponding importance metric is greater than any other feature's corresponding importance metric), is removed, then the machine learning model's performance (as indicated by a performance metric) should decrease. As additional features are removed from the dataset, the machine learning model's performance may be expected to decrease at a decelerating rate (e.g., for one or more subsequent features removed, there is a smaller decrease in model performance). In contrast, the ML explanation system 102 may determine that the set of importance metrics should not be used, for example, if the machine learning model's performance does not decrease at a decelerating rate.

In some embodiments, the ML explanation system 102 may generate, based on a first plurality of importance metrics, a first plurality of performance metrics. The ML explanation system 102 may generate, based on a second plurality of importance metrics, a second plurality of performance metrics. The second plurality of importance metrics may indicate a different ordering of features than the first plurality of importance metrics (e.g., the first plurality may have been generated using a first XAI technique and the second plurality may have been generated using a second XAI technique). The ML explanation system 102 may determine, based on a comparison between the first plurality of performance metrics and the second plurality of performance metrics, that the first plurality of importance metrics should be used to explain classifications made by the machine learning model.

In some embodiments, the ML explanation system 102 may determine a first quantity of changes in gradient corresponding to the first plurality of performance metrics. The ML explanation system 102 may determine a second quantity of changes in gradient corresponding to the second plurality of performance metrics. Based on a determination that the second quantity is greater than the first quantity, the ML explanation system 102 may determine that the first plurality of importance metrics should be used to explain classifications made by the machine learning model.

Figure 2:
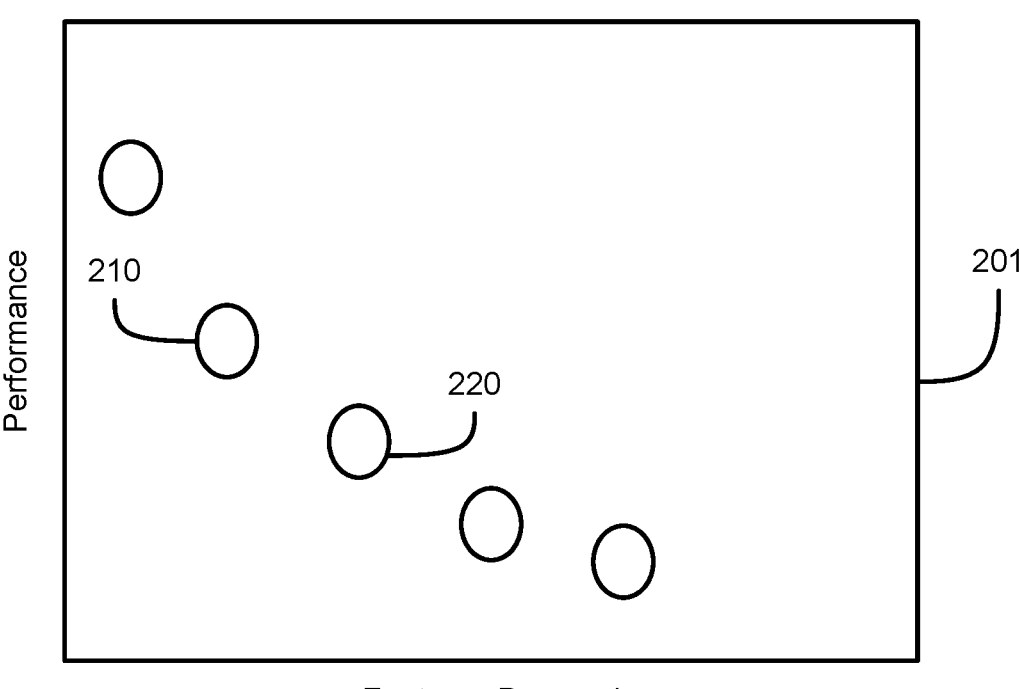
FIG. 2 shows example evaluations of two explanations of a model, in accordance with some embodiments.

For example, referring to FIG. 2, a first and second set of plurality metrics are shown in graph 201 and graph 251 respectively. Each of the points (e.g., points 210, 220, 260, 270, etc.) in the graphs 201 and 251 may correspond to a performance metric of a model after a feature has been removed from a dataset used to train the model (e.g., as described above in connection with FIG. 1). The graph 201 may correspond to the first plurality of importance metrics and the graph 251 may correspond to the second plurality of importance metrics described above in connection with FIG. 1. Each plurality of importance metrics may indicate a different ordering of features (e.g., in order of influence on the model) in the dataset. For example, the first set of importance metrics may indicate that the ordering of importance of features is A, B, C, D, E and the second set of importance metrics may indicate that the ordering of importance of features should be A, C, B, D, E. To determine which importance metrics to use for explaining decisions made by the model, the ML explanation system 102 may compare the change in performance (e.g., as shown in graphs 201 and 251).

For example, moving from left to right, the slope of a line between pairs of points would change a number of times in graph 251 (e.g., more than a threshold number) and may thus indicate that the second set of importance metrics should not be used to explain decisions made by the model. In contrast, the slope of a line between pairs of points may change less than a threshold number of times in graph 201. This may indicate that the first set of importance metrics can be used to explain decisions made by the model. Additionally or alternatively, the ML explanation system 102 may determine that the points in graph 201 are asymptotic (e.g., approaching a value at a decreasing rate) and thus may determine that the first set of importance metrics should be used to explain decisions made by the model.

The user device 104 may be any computing device, including, but not limited to, a laptop computer, a tablet computer, a hand-held computer, smartphone, other computer equipment (e.g., a server or virtual server), including "smart," wireless, wearable, or mobile devices. The ML explanation system 102 may include one or more computing devices described above or may include any type of mobile terminal, fixed terminal, or other device. For example, the ML explanation system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the ML explanation system 102, those operations may be performed by components of the user device 104. In some embodiments, the various computers and systems described herein may include one or more computing devices that are programmed to perform the described functions.

One or more components of the ML explanation system 102 or user device 104 may receive content or data via input/output (I/O) paths. The one or more components of the ML explanation system 102 or the user device 104 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the ML explanation system 102 or the user device 104 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a Universal Serial Bus (USB) port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a satellite network, a combination of these networks, or other types of communications networks or combinations of communications networks. The devices in FIG. 1 (e.g., ML explanation system 102 or the user device 104) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, or firmware components operating together. For example, the ML explanation system 102, any component of the processing system (e.g., the communication subsystem 112 or the ML subsystem 114), and the user device 104 may be implemented by one or more computing platforms.

Figure 3:
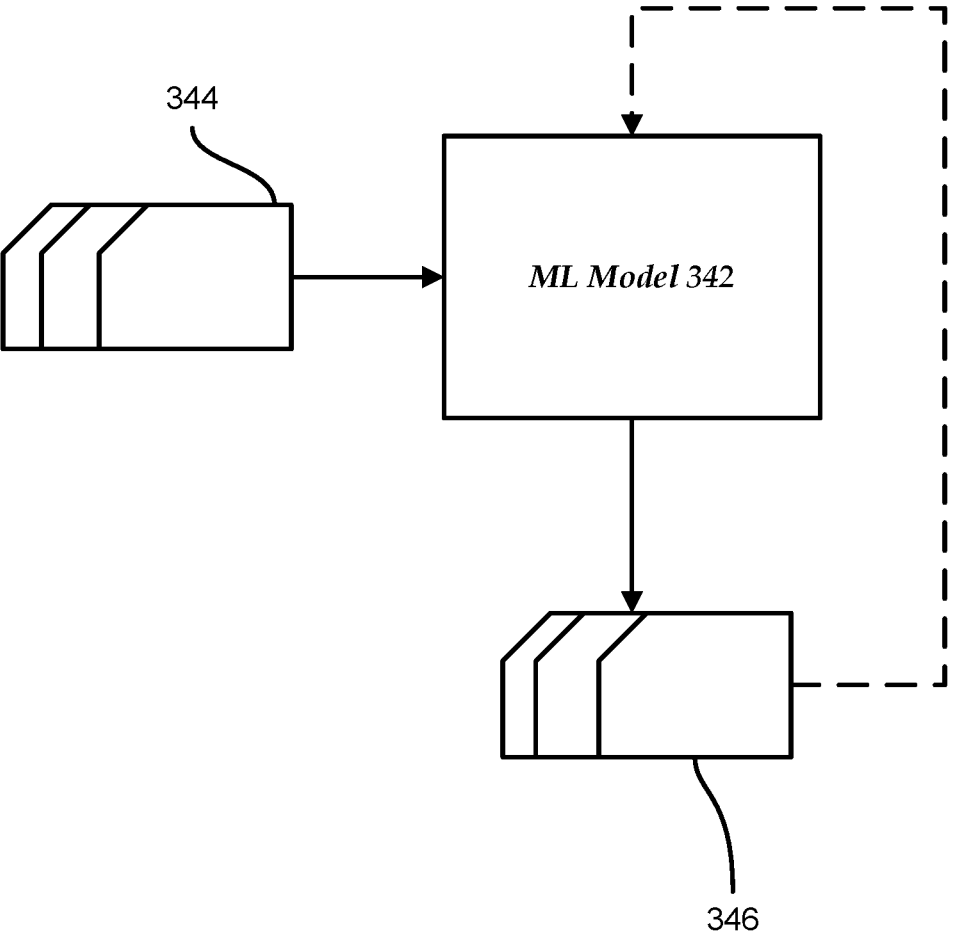
FIG. 3 shows an example machine learning model, in accordance with some embodiments.

One or more machine learning models discussed above may be implemented (e.g., in part), for example, as shown in FIGS. 1-3. With respect to FIG. 3, machine learning model 342 may take inputs 344 and provide outputs 346. In one use case, outputs 346 may be fed back to machine learning model 342 as input to train machine learning model 342 (e.g., alone or in conjunction with user indications of the accuracy of outputs 346, with labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed.

In some embodiments, the machine learning model 342 may include an artificial neural network. In some embodiments, machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 342 may be self-learning or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 342 trained by the machine learning subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 342 may be structured as a factorization machine model. The machine learning model 342 may be a nonlinear model or supervised learning model that can perform classification or regression. For example, the machine learning model 342 may be a general-purpose supervised learning algorithm that the system uses for both classification and regression tasks. Alternatively, the machine learning model 342 may include a Bayesian model configured to perform variational inference. The machine learning model 342 may be configured to determine whether two datasets are similar, to generate a vector representation of a dataset or a portion of a dataset, or a variety of other functions described above in connection with FIGS. 1-2.

Figure 4:
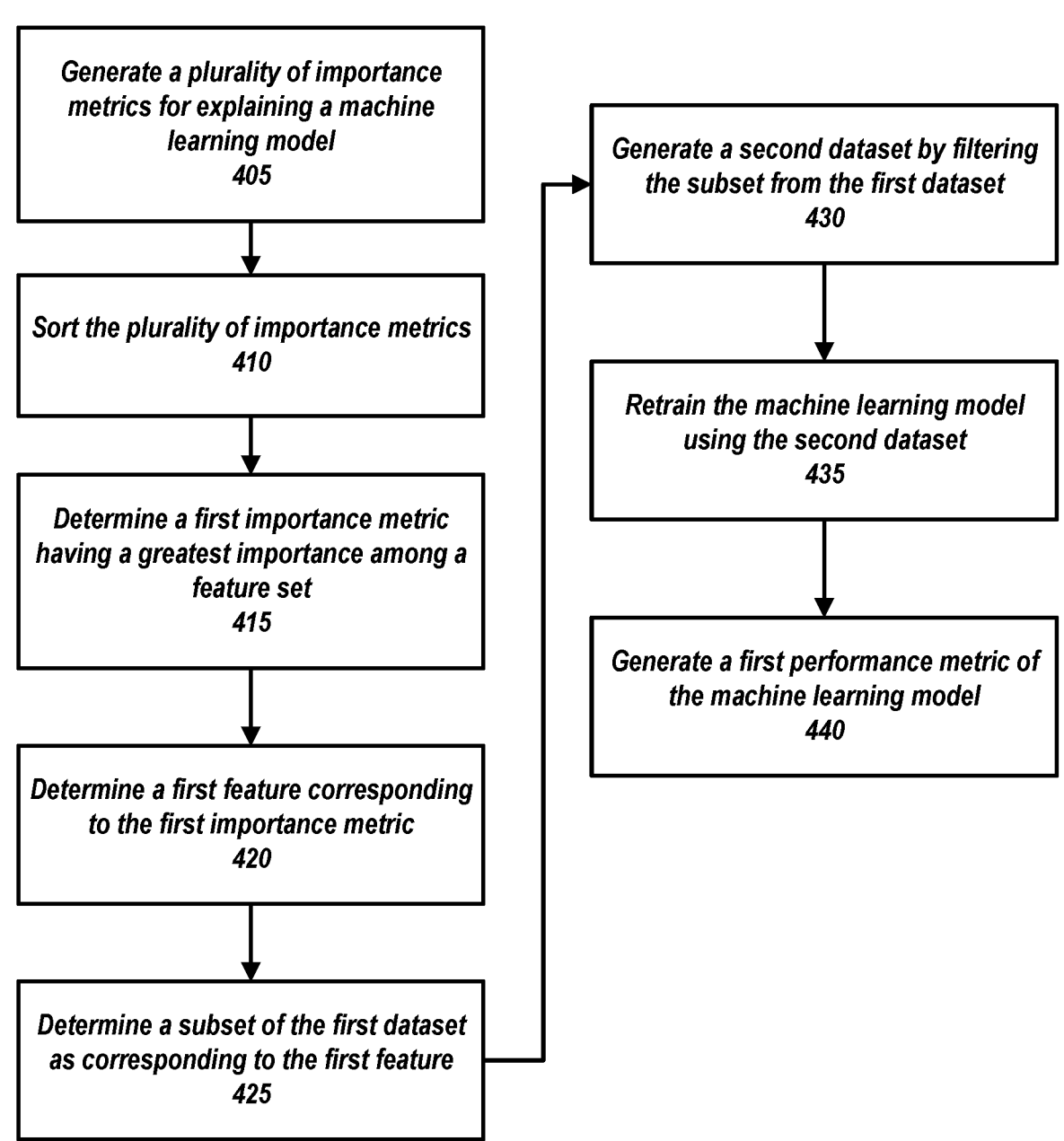
FIG. 4 shows an example flowchart of the actions involved in evaluating explanations for models, in accordance with some embodiments.

FIG. 4 is an example flowchart of processing operations of a method that enables the various features and functionality of the systems as described in detail above. For example, process 400 of FIG. 4 may represent the actions taken by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

Figure 5:
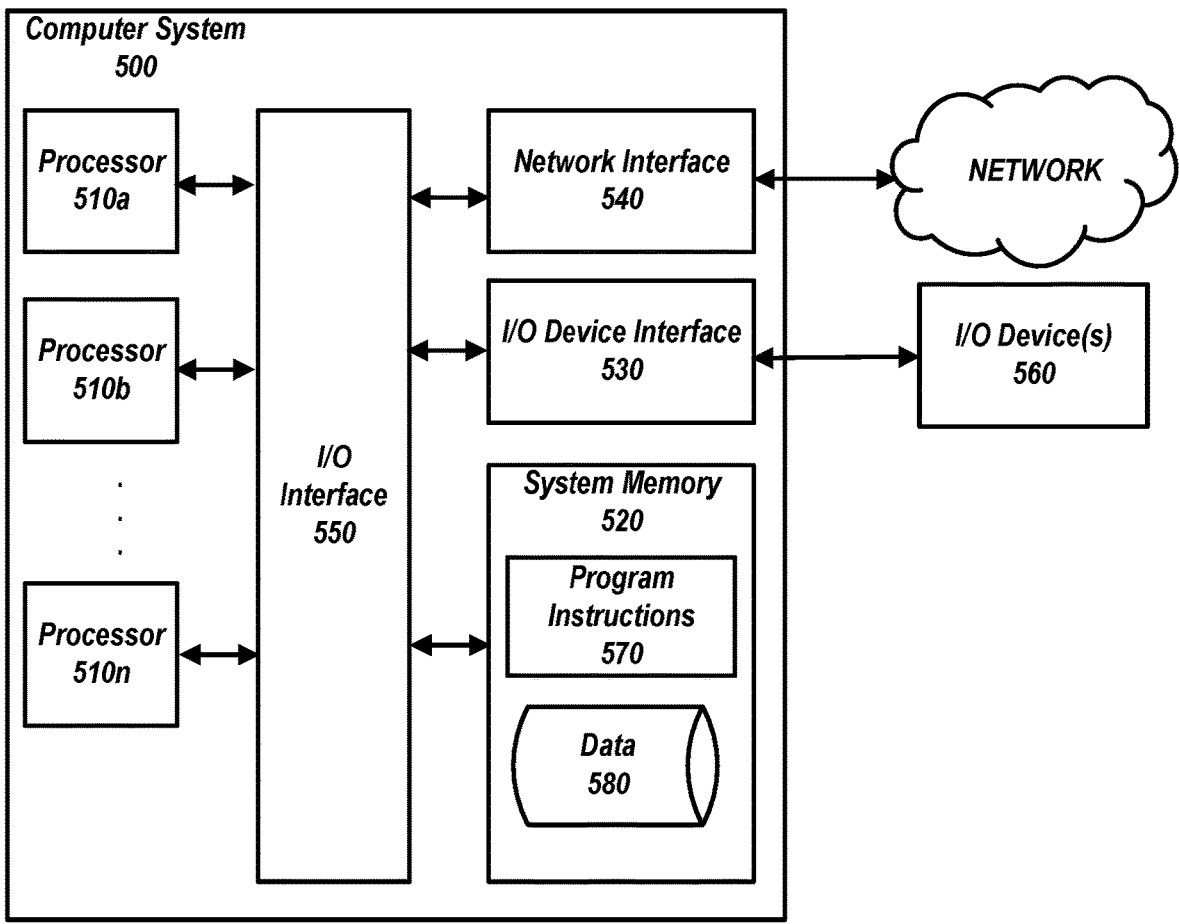
FIG. 5 shows an example computing system that may be used in accordance with some embodiments.

In some embodiments, the method may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that the operations performed by ML explanation system 102 may be performed using one or more components in system 100 (FIG. 1) or computer system 500 (FIG. 5).

At 405, ML explanation system 102 may generate a plurality of importance metrics. Each importance metric of the plurality of importance metrics may correspond to a respective feature of a feature set used by a machine learning model. The feature set may include all of the features used in a dataset for training the machine learning model. For example, a first importance metric may correspond to a first feature of the dataset and a second importance metric may correspond to a second feature of the dataset. Each importance metric may help explain why a decision was made by the machine learning model or may indicate to what degree a corresponding feature influenced a decision made by the machine learning model (e.g., in making a classification or in generating other output).

At 410, ML explanation system 102 may sort the plurality of importance metrics. For example, the plurality of importance metrics may include rational numbers and the ML explanation system 102 may sort each importance metric in ascending (e.g., smallest to largest) or descending order (e.g., largest to smallest).

At 415, ML explanation system 102 may determine a first importance metric having a greatest importance among the feature set. The first importance metric may correspond to a feature that has been determined to be the most influential feature of the dataset or feature set. For example, if the feature set includes feature A with corresponding importance metric of 110, feature B with corresponding importance metric of 56, and feature C with corresponding importance metric of 84, then the ML explanation system 102 may determine that 110 is the first importance metric because it has the greatest importance metric (e.g., 110 is greater than the importance metrics of 84 and 56 for features C and B respectively).

At 420, ML explanation system 102 may determine a first feature corresponding to the first importance metric. For example, if the first importance metric (e.g., the greatest importance metric) corresponds to feature A, then the ML explanation system 102 may determine that the first feature is feature A. The ML explanation system 102 may determine the first feature so that it can be dropped from the dataset. By removing the first feature from the dataset and retraining the machine learning model, the ML explanation system 102 may determine the effect the first feature had on the performance of the machine learning model. If the first feature is truly as important as the corresponding importance metric indicates, the machine learning model may have a large drop (e.g., greater than a threshold decrease compared to performance of the machine learning model when trained on the full dataset that includes the first feature) in performance after removing the first feature. However, if dropping the first feature does not lead to a large decrease in performance (e.g., less than a threshold decrease when compared to performance of the machine learning model when trained on the full dataset that includes the first feature), the ML explanation system 102 may determine that the importance metrics should not be used to explain classifications or other output generated by the machine learning model.

At 425, ML explanation system 102 may determine a subset of the first dataset that corresponds to the first feature. For example, the dataset may be arranged in rows and columns with each feature representing a column and each instance of data represented as a row in the dataset. The first feature may be represented as an individual column in the first dataset. For example, feature A (e.g., as discussed above) may be the first column in the first dataset. The subset of the first dataset may be determined to be the first column in the first dataset.

At 430, the ML explanation system 102 may generate a second dataset by filtering the subset determined in 425 from the first dataset. Filtering the subset may include deleting the subset. The ML explanation system 102 may generate the second dataset by creating a copy of the first dataset and deleting the subset (e.g., one or more columns) from the copy of the first dataset. For example, the ML explanation system 102 may generate a second dataset by deleting the column corresponding to feature A (e.g., from a copy of the first dataset).

At 435, the ML explanation system 102 may retrain the machine learning model using the second dataset. The second dataset may include each feature of the feature set that was included in the first dataset except for the subset of the first dataset that was filtered at 430. The ML explanation system 102 may use the second dataset to retrain the machine learning model from scratch. For example, one or more parameters (e.g., weights) of the machine learning model may be reset to their starting values or random values. The ML explanation system 102 may train the machine learning model using the second dataset. For example, the machine learning model may be trained using the same training techniques that were used with the first dataset.

At 440, the ML explanation system 102 may generate a first performance metric of the machine learning model. The first performance metric may indicate an amount that the performance of the machine learning model changed due to removal of the first feature from the first dataset. For example, the first performance metric may be an accuracy measurement of the machine learning model after being trained on the second dataset. The first performance metric may be compared (e.g., subtracted from) an overall performance metric that corresponds to the performance of the machine learning model after being trained on the first dataset (e.g., the dataset with all features included). The difference between the first performance metric and the overall performance metric may indicate an amount that the performance of the machine learning model changed (e.g., decreased or increased) due to filtering the first feature from the first dataset.

The performance metric may be used to determine the effect of removing features from the first dataset. Steps 405-440 may be repeated, and additional performance metrics may be generated by removing other features (e.g., other columns) from the first dataset. For example, a second feature corresponding to the second greatest importance metric may be removed from the first dataset, and a performance metric that indicates how well the machine learning model performed without the second feature may be obtained. The first and second performance metrics may be part of a first set of performance metrics. The first set of performance metrics may be compared with a second set of performance metrics. The second set of performance metrics may correspond to different importance metrics. For example, the first set of importance metrics may be generated using SHAP values and the second set of importance metrics may be generated using LIME values.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 or FIG. 5 could be used to perform one or more of the actions in FIG. 4.

FIG. 5 is a diagram that illustrates an exemplary computer system 500 in accordance with embodiments of the present technique. Various portions of systems and methods described herein may include or be executed on one or more computer systems similar to computer system 500. Further, processes and modules described herein may be executed by one or more processing systems similar to that of computer system 500.

Computer system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computer system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computer system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer-readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard drives), or the like. System memory 520 may include a non-transitory computer-readable storage medium that may have program instructions stored thereon that are executable by a computer processor (e.g., one or more of processors 510*a*-510*n*) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510*a*-510*n*, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to costs constraints, some features disclosed herein may not be presently claimed and may be claimed in later filings, such as continuation applications or by amending the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes," and the like, mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive (i.e., encompassing both "and" and "or"). Terms describing conditional relationships (e.g., "in response to X, Y," "upon X, Y," "if X, Y," "when X, Y," and the like), encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing actions A, B, C, and D) encompass all such attributes or functions being mapped to all such objects, as well as subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method for evaluating the effectiveness of explanation metrics in identifying important features in data, the method comprising: generating a first plurality of importance metrics, wherein the machine learning model is trained on a first dataset; determining a first importance metric of the first plurality of importance metrics; in response to determining that a first feature of the first dataset corresponds to the first importance metric, determining a subset of the first dataset as corresponding to the first feature; generating a second dataset by filtering the subset from the first dataset; retraining the machine learning model using the second dataset; and in response to retraining the machine learning model using the second dataset, generating a first performance metric of the machine learning model.

2. The method of any of the preceding embodiments, further comprising: determining a second importance metric of the plurality of importance metrics, the second importance metric having a second greatest importance among the feature set; based on determining the second importance metric, generating a second dataset that comprises each feature of the feature set except the first feature and except a second feature corresponding to the second importance metric.

3. The method of any of the preceding embodiments, further comprising: retraining the machine learning model using the second dataset; and in response to retraining the machine learning model using the second dataset, generating a second performance metric of the machine learning model.

4. The method of any of the preceding embodiments, further comprising: generating a first plurality of performance metrics comprising the first performance metric; generating, based on a second plurality of importance metrics, a second plurality of performance metrics, wherein the second plurality of importance metrics indicates a different ordering of features than the first plurality of importance metrics; and determining, based on a comparison between the first plurality of performance metrics and the second plurality of performance metrics, that the first plurality of importance metrics should be used to explain classifications made by the machine learning model.

5. The method of any of the preceding embodiments, wherein determining that the first plurality of importance metrics should be used to explain classifications made by the machine learning model comprises: determining a first quantity of changes in gradient corresponding to the first plurality of performance metrics; determining a second quantity of changes in gradient corresponding to the second plurality of performance metrics; and based on a determination that the second quantity is greater than the first quantity, determining that the first plurality of importance metrics should be used to explain classifications made by the machine learning model.

6. The method of any of the preceding embodiments, further comprising: in response to determining that the first plurality of importance metrics should be used, generating a recommendation to use the first plurality of importance metrics; and displaying the recommendation in a user interface.

7. The method of any of the preceding embodiments, wherein each importance metric of the plurality of importance metrics indicates a relevance level that a corresponding feature has for a classification made by the machine learning model.

8. The method of any of the preceding embodiments, wherein determining a first importance metric of the plurality of importance metrics comprises sorting the plurality of importance metrics in order from greatest importance to least importance.

9. The method of any of the preceding embodiments, wherein the plurality of importance metrics comprises one of SHAP values or local interpretable model-agnostic explanation values.

10. The method of any of the preceding embodiments, further comprising: determining that the first performance metric of the machine learning model satisfies a threshold; and in response to determining that the first performance metric of the machine learning model satisfies the threshold, determining that the first plurality of importance metrics should be used to explain classifications made by the machine learning model.

11. A tangible, non-transitory, machine-readable medium storing instructions that, when executed by a data processing apparatus, cause the data processing apparatus to perform operations comprising those of any of embodiments 1-11.

12. A system comprising: one or more processors; and memory storing instructions that, when executed by the processors, cause the processors to effectuate operations comprising those of any of embodiments 1-11.

13. A system comprising means for performing any of embodiments 1-11.

What is claimed is:

1. A machine learning system for evaluating effectiveness of explanation metrics in identifying important features in data, the system comprising:

one or more processors programmed with computer program instructions that, when executed by the one or more processors, cause operations comprising:

with respect to a first feature and a second feature of a feature set of a training dataset on which a machine learning model is trained, determining a first importance metric corresponding to the first feature that indicates the first feature to have a greatest importance among the feature set and a second importance metric corresponding to the second feature that indicates the second feature to have a second greatest importance among the feature set;

in response to the first importance metric indicating the first feature to have the greatest importance and the second importance metric indicating the second feature to have the second greatest importance, executing (i) a first retrained model corresponding to the machine learning model retrained using a first dataset to generate a first performance metric of the first retrained model, and (ii) a second retrained model corresponding to the machine learning model retrained using a second dataset to generate a second performance metric of the second retrained model, the first dataset comprising data of the training dataset without a first subset corresponding to the first feature, and the second dataset comprising data of the training dataset without a second subset corresponding to the second feature; and based on the first performance metric being a lower performance than the second performance metric, generating an indication to use the first importance metric corresponding to the first feature to explain classifications made by the machine learning model.

2. The system of claim 1, the operations further comprising:

based on the first importance metric and the second importance metric respectively indicating the first feature and the second feature to have the greatest importance and the second greatest importance among the feature set, generating (i) the first dataset to comprise features of the feature set other than the first feature and (ii) the second dataset that comprises features of the feature set other than the first feature and the second feature.

3. A method for evaluating effectiveness of explanation metrics in identifying important features in data, the method comprising:

with respect to a first feature and a second feature of a feature set of a training dataset on which a machine learning model is trained, determining a first importance metric corresponding to the first feature that indicates the first feature to have a greatest importance among the feature set and a second importance metric corresponding to the second feature that indicates the second feature to have a second greatest importance among the feature set;

in response to the first importance metric indicating the first feature to have the greatest importance and the second importance metric indicating the second feature to have the second greatest importance, executing (i) a first retrained model corresponding to the machine learning model retrained using a first dataset to generate a first performance metric of the first retrained model, and (ii) a second retrained model corresponding to the machine learning model retrained using a second dataset to generate a second performance metric of the second retrained model, the first dataset comprising data of the training dataset without a first subset corresponding to the first feature, and the second dataset comprising data of the training dataset without a second subset corresponding to the second feature; and based on the first performance metric being a lower performance than the second performance metric, generating an indication to use the first importance metric corresponding to the first feature to explain classifications made by the machine learning model.

4. The method of claim 3, further comprising:

based on the first importance metric and the second importance metric respectively indicating the first feature and the second feature to have the greatest importance and the second greatest importance among the feature set, generating (i) the first dataset to comprise all features of the feature set except the first feature and 19
20

(ii) the second dataset that comprises all features of the feature set except the first feature and except the second feature.

5. The method of claim 3, further comprising:

generating (i) a first plurality of performance metrics, comprising the first performance metric, based on a first plurality of importance metrics comprising the first importance metric and (ii) a second plurality of performance metrics, comprising the second performance metric based on a second plurality of importance metrics comprising the second performance metric, wherein the second plurality of importance metrics indicates a different ordering of features than the first plurality of importance metrics; and based on a highest-to-lowest ordering of the first plurality of performance metrics matching a highest-to-lowest ordering of the first plurality of importance metrics, generating one or more indications to use the first plurality of importance metrics to explain classifications made by the machine learning model.

6. The method of claim 3, further comprising:

generating (i) a first plurality of performance metrics, comprising the first performance metric, based on a first plurality of importance metrics comprising the first importance metric and (ii) a second plurality of performance metrics, comprising the second performance metric based on a second plurality of importance metrics comprising the second performance metric, wherein the second plurality of importance metrics indicates a different ordering of features than the first plurality of importance metrics;

determining that a first quantity of changes in gradient corresponding to the first plurality of performance metrics is greater than a second quantity of changes in gradient corresponding to the second plurality of performance metrics; and based on determining that the second quantity is greater than the first quantity, generating one or more indications to use the first plurality of importance metrics to explain classifications made by the machine learning model.

7. The method of claim 3, further comprising:

displaying, in a user interface, based on the indication, a recommendation to use a first plurality of importance metrics, comprising the first importance metric corresponding to the first feature, to explain classifications made by the machine learning model.

8. The method of claim 7, wherein each importance metric of the first plurality of importance metrics indicates a relevance level that a corresponding feature has for a classification made by the machine learning model.

9. The method of claim 3, wherein the first importance metric comprises a Shapley additive explanation value.

10. The method of claim 3, wherein the first importance metric comprises a local interpretable model-agnostic explanation value.

11. The method of claim 3, further comprising:

determining that the first performance metric of the first retrained model satisfies a threshold performance drop relative to a performance metric of the machine learning model; and based on determining that the first performance metric of the first retrained model satisfies the threshold performance drop, determining that a first plurality of importance metrics, comprising the first importance metric, should be used to explain classifications made by the machine learning model.

12. One or more non-transitory computer-readable media comprising instructions that, when executed by one or more processors, causes operations comprising:

with respect to a first feature and a second feature of a feature set of a training dataset on which a machine learning model is trained, determining a first importance metric corresponding to the first feature that indicates the first feature to have a greatest importance among the feature set and a second importance metric corresponding to the second feature that indicates the second feature to have a second greatest importance among the feature set;

in response to the first importance metric indicating the first feature to have the greatest importance and the second importance metric indicating the second feature to have the second greatest importance, executing (i) a first retrained model corresponding to the machine learning model retrained using a first dataset to generate a first performance metric of the first retrained model, and (ii) a second retrained model corresponding to the machine learning model retrained using a second dataset to generate a second performance metric of the second retrained model, the first dataset comprising data of the training dataset without a first subset corresponding to the first feature, and the second dataset comprising data of the training dataset without a second subset corresponding to the second feature; and based on the first performance metric being a lower performance than the second performance metric, generating an indication to use the first importance metric corresponding to the first feature to explain classifications made by the machine learning model.

13. The one or more non-transitory computer-readable media of claim 12, wherein the instructions, when executed, cause operations further comprising:

based on the first importance metric and the second importance metric respectively indicating the first feature and the second feature to have the greatest importance and the second greatest importance among the feature set, generating (i) the first dataset to comprise features of the feature set other than the first feature and (ii) the second dataset that comprises features of the feature set other than the first feature and the second feature.

14. The one or more non-transitory computer-readable media of claim 12, wherein the instructions, when executed, cause operations further comprising:

generating (i) a first plurality of performance metrics, comprising the first performance metric, based on a first plurality of importance metrics comprising the first importance metric and (ii) a second plurality of performance metrics, comprising the second performance metric based on a second plurality of importance metrics comprising the second performance metric, wherein the second plurality of importance metrics indicates a different ordering of features than the first plurality of importance metrics; and based on a highest-to-lowest ordering of the first plurality of performance metrics matching a highest-to-lowest ordering of the first plurality of importance metrics, generating one or more indications to use the first plurality of importance metrics to explain classifications made by the machine learning model.

15. The one or more non-transitory computer-readable media of claim 12, wherein the instructions, when executed, cause operations further comprising:

generating (i) a first plurality of performance metrics, comprising the first performance metric, based on a first plurality of importance metrics comprising the first importance metric and (ii) a second plurality of performance metrics, comprising the second performance metric based on a second plurality of importance metrics comprising the second performance metric, wherein the second plurality of importance metrics indicates a different ordering of features than the first plurality of importance metrics;

determining that a first quantity of changes in gradient corresponding to the first plurality of performance metrics is greater than a second quantity of changes in gradient corresponding to the second plurality of performance metrics; and based on determining that the second quantity is greater than the first quantity, generating one or more indications to use the first plurality of importance metrics to explain classifications made by the machine learning model.

16. The one or more non-transitory computer-readable media of claim 12, wherein the instructions, when executed, cause operations further comprising:

displaying, in a user interface, based on the indication, a recommendation to use a first plurality of importance metrics, comprising the first importance metric corresponding to the first feature, to explain classifications made by the machine learning model.

17. The one or more non-transitory computer-readable media of claim 16, wherein each importance metric of the first plurality of importance metrics indicates a relevance level that a corresponding feature has for a classification made by the machine learning model.

18. The one or more non-transitory computer-readable media of claim 12, wherein the first importance metric comprises a Shapley additive explanation value.

19. The one or more non-transitory computer-readable media of claim 12, wherein the first importance metric comprises a local interpretable model-agnostic explanation value.

20. The one or more non-transitory computer-readable media of claim 12, wherein the instructions, when executed, cause operations further comprising:

determining that the first performance metric of the first retrained model satisfies a threshold performance drop relative to a performance metric of the machine learning model; and based on determining that the first performance metric of the first retrained model satisfies the threshold performance drop, determining that a first plurality of importance metrics, comprising the first importance metric, should be used to explain classifications made by the machine learning model.

\* \* \* \* \*